Oct. 24, 1967     N. O. YOUNG     3,348,446
INTERFEROMETER WITH PIVOT MEANS LOCATED BETWEEN A MIRROR
AND A TRANSPARENT PLATE HAVING TOTALLY REFLECTIVE AND
SEMI-REFLECTIVE LIGHT DIVIDING MEANS LOCATED THEREON
Filed Nov. 22, 1963     2 Sheets—Sheet 1
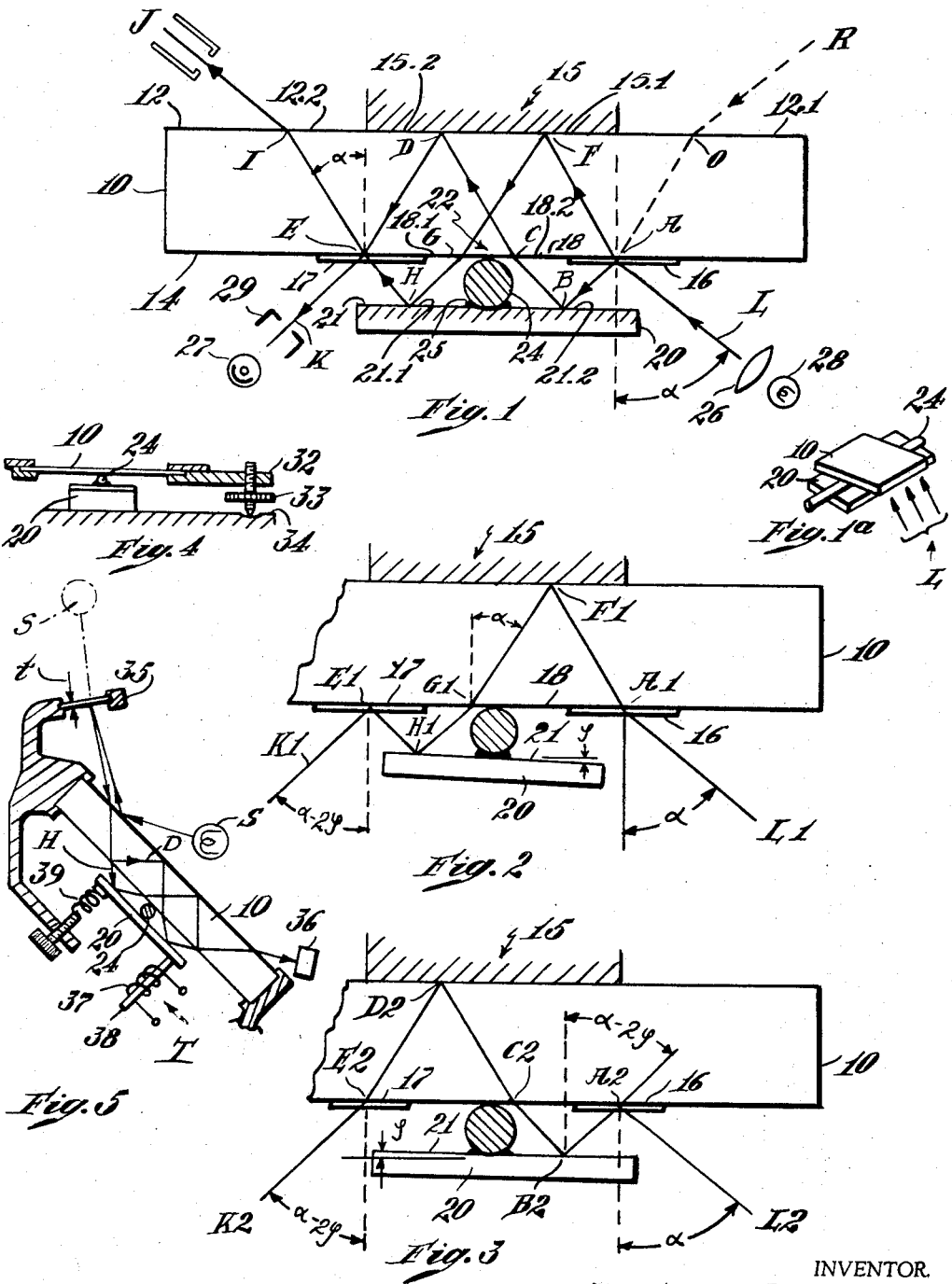
INVENTOR.
Niels O. Young
BY
Roberts, Cushman & Grover,
ATT'YS.

3,348,446
INTERFEROMETER WITH PIVOT MEANS LO-
CATED BETWEEN A MIRROR AND A TRANS-
PARENT PLATE HAVING TOTALLY REFLEC-
TIVE AND SEMI-REFLECTIVE LIGHT DIVID-
ING MEANS LOCATED THEREON
Niels O. Young, South Lincoln, Mass., assignor to Block
Engineering, Inc., Cambridge, Mass., a corporation of
Massachusetts
Filed Nov. 22, 1963, Ser. No. 325,710
14 Claims. (Cl. 88—14)

The field of this invention is interferometry, and more particularly it relates to interferometers of exceptional simplicity and ruggedness.

Many techniques have been proposed for detecting, controlling and measuring various physical properties, functions and values by means of interferometry. However, while a large number of interferometer configurations are known for such purposes, virtually all of these are of relatively delicate construction, require large numbers of expensive precision components, are unstable in operation, and are difficult to align. Accordingly various detection, measurement and control schemes are not as widely used as their inherent characteristics would recommend, because of the problems introduced by the interferometers associated therewith.

Objects of the invention are to provide interferometric instruments and various interferometric techniques utilizing such instruments which eliminate or at least appreciably minimize difficulties of alignment, vibration and temperature stability, and complexity of construction and operation; to provide an interferometer of very simple, inherently rugged, vibration resistant, temperature stable, and easily aligned construction which is particularly suitable for precision measurement and control purposes, and which in some instances makes desirable interferometric techniques practically feasible; to provide an interferometer having the above characteristics which is suitable for use in any of the standard interferometer applications including angular measurements, thickness measurements, interference spectroscopy including audiofrequency recorded spectrograms, and optical-electrical phase lock systems such as for driving interferometer mirrors at accurately controlled time programmed velocities; and to provide an interferometer which is particularly useful in systems of the type described in copending application Ser. No. 120,600 for Spectrum Analysis, filed June 29, 1961, enhancing the advantages of such systems.

The substance and nature of the invention can be shortly characterized in a principal aspect as contemplating the combination, in interferometric apparatus, of two optical elements which define at least three optical surfaces two or more of which are on one element and the third on the other element. The elements can be tilted relatively to each other, with control of the amount, rate, and frequency of the rotation as may be desired or required. The two outer surfaces have predominantly reflective (such as opaquely silvered) regions and also predominantly transmissive (such as unobstructed interfaces between different optical media) regions. The intermediate surface or surfaces have transmissive regions and also transmissive as well as reflective (such as half silvered semi-reflective) regions. These regions are so arranged that radiation impinging on a transmissive-reflective region of an intermediate region is divided into two components which are recombined and united at a second transmissive-reflective region of an intermediate surface, after having been deflected by reflective regions and passed through transmissive regions in two separate but geometrically similar paths located between the said dividing and recombining, respectively, transmissive-reflective regions. The various surfaces and regions are so located and distanced that the respective lengths of the two component paths will differ depending on the inclination of the two surface-defining elements (being equal at a well defined such as zero inclination), and that the two paths will at any inclination converge at the uniting region with essentially parallel wave fronts, exhibiting interference phenomena at that region if the path lengths vary due to a given inclination of the two elements and consequence relative retardation in one of the paths. An interference pattern will be defined by a given angle of inclination, and the interference fringe pattern can be varied in time as a function of change of inclination magnitude.

In a preferred embodiment the invention involves merely three components, namely a transparent plate means whose parallel faces are at appropriately selected regions transmissive, reflective, and semi-reflective, respectively, a plane mirror means, and a pivot means which spaces the plate and mirror means on two lines which remain parallel at any pivotal inclination.

These and other useful objects and aspects of the nature of the invention will appear from the following presentation of its theoretical principles so far as desirable for its understanding, and of a detailed description of several practical embodiments illustrating its novel characteristics.

The description refers to drawings in which

FIG. 1 is a schematic view of a basic interferometer unit according to the invention, and FIG. 1a is a modification;

FIGS. 2 and 3, similar to FIG. 1, are diagrammatic illustrations of the operation of the unit according to FIG. 1;

FIG. 4 is a diagrammatic section of an angle measuring device incorporating the invention;

FIG. 5 is a diagrammatic view of a thickness measuring gauge according to the invention;

Figure 6:
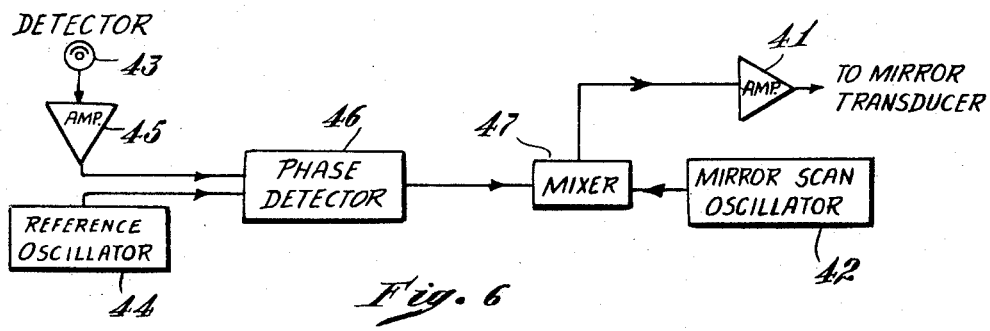
FIG. 6 is a circuit diagram illustrating one possibility of driving apparatus incorporating the invention.

The construction and operation of a typically and practically very useful basic interferometer unit according to the invention will first be described with references to FIGS. 1 to 3.

As shown in FIG. 1, such an interferometer unit has a transparent plate 10 with parallel, optically flat surfaces 12 and 14. The first surface 12 is totally reflective, such as fully silvered, at 15 including the regions 15.1 and 15.2 with reflecting portions D and F, such that all internal rays are substantially totally reflected back into the plate. The transparent regions 12.1 and 12.2 of the surface 12 at either side of 15, containing portions I and O, are left uncoated so as to be substantially transparent for rays at predetermined angles of incidence. The second surface 14 is transmissive as well as reflective, such as half silvered, at regions 16 and 17 including the portions A and E, so that these transmission-reflective regions will operate as beam splitters. The intermediate regions 18.1 and 18.2 with portions C and G of the surface 14, between the regions 16 and 17, are left substantially transparent. A second plate 20 has a front reflective, such as silvered, third surface 21 maintained in spaced relation to the surface 14 of the plate 10 by a pivot 22 which, as illustrated, is in this embodiment provided by a cylindrical rod 24 cemented to the mirror 20 at 25, dividing the mirror 21 into two reflective regions 21.1 and 21.2.

The various transmissive, transmissive-reflective, and reflective regions are arranged, as clearly shown, such as to define between one transmissive-reflective surface region 16 and the second similar surface region 17 two geometrically similar beam paths each of which traverses and is reflected back through the plate 10, and also traverses and is reflected back across the space between the plate 10 and the mirror 20. These paths can be defined by the respective reflected and refracted portions as A–B–C–D–E and A–F–G–H–E, respectively. Tilting the plate 20 relative to the plate 10 produces a differential change in the length of the beam paths but, as will be shown below, does not produce any differential deflections of the directions of the respective beams incident at portion A and at portion E of face 14. Accordingly, light energy incident on the beam-splitting region 16 at portion A from points L or R is divided between the two interfering beam paths described above and the divided energies are recombined in interfering relation at a finite portion E of region 17 with a retardation that is dependent upon the relative tilt between the plate 20 and the plate 10. The interference pattern can be observed at either J or K, since 17 is a light splitter.

The absence of differential deflection between the two beam paths such that interference results, will now be demonstrated with reference to FIGS. 2 and 3, all angles of incidence being referred to a perpendicular to the impinged plane in conventional manner.

FIG. 2 illustrates the behavior of that portion of the energy which comes from L1 at an angle of incidence $\alpha$ and is directed along the path A1–F1–G1–H1–E1 when the mirror 20 is given an inclination of $\varphi$ from its position parallel to the plate 10, which position may be called normal. Obviously, the inclination of the mirror cannot effect any change in the portion A1–F1–G1 which is identical with the portion A–F–G shown in FIG. 1, and the ray G1–H1 leaves the plate 10 at the same angle $\alpha$ as in FIG. 1. The beam H1–E1 however, reflected from the mirror 20, is deflected by an angle $2\varphi$ from the normal path due to the inclination $\varphi$ of the mirror plate 20. The exit beam E1–K1 is similarly deflected and will emerge at an angle $\alpha-2\varphi$. FIG. 3 illustrates the path of that portion of the energy from L2 which is reflected at A2 and impinges upon the $\varphi$ inclined mirror plate 20 at B2. The beam B2–C2 is reflected back to the plate 10 and deflected by an angle of $2\varphi$ from its normal path as shown in FIG. 1. Obviously, the path C2–D2–E2 is not further affected by the inclination of the mirror 20 and the exit beam E2–K2 will emerge from the plate 10 at an angle $\alpha-2\varphi$.

Thus, the exit beams from the two possible beam paths emerge at the same angle $\alpha-2\varphi$ from the plate 10 and therefore their wave fronts will be parallel so that interference can occur over appreciable portions of the field and not only over a vanishingly small range of angles for which some part of each wave front is parallel.

While inclination of the mirror plate 20 does produce a relative lateral shifting of the two exit beams E1–K1 and E2–K2 so that some energy is lost, the effective fields available with this instrument are large enough so that an appreciable useful area of overlap remains in which interference can occur.

In instruments of this type the dimensional tolerances of the components are very important if the field is to contain no more than one fringe near zero order. The tolerances which can be allowed for that purpose are, in terms of the wave length $\lambda$ of the incident radiation, as follows. The flatness of the surface portions A, B, D, E, F and H should be better than $$\frac{\sqrt{6}}{24}\lambda$$

each, or collectively $\lambda/4$. The flatness or surface portions C and G should be better than $$\frac{\sqrt{2}}{4}\lambda$$

or collectively $\lambda/2$. The parallelism between the surfaces 12 and 14 should be better than $5\lambda$.

The parallelism of the surfaces 12 and 14 and of the front reflective surface of the mirror 20 along the pivot axis should be about $5\lambda$. If these tolerances are observed, and the instrument is assembled with a pivot means, such as rod 24, which assures parallelism within $5\lambda$, the interferometer according to the invention is virtually always in alignment.

Because of its construction the present interferometer is inherently quite resistant to vibration. Any vibration in the plane of the plate 10 will only cause the mirror plate 20 to slide around in its own plane, which does not affect the interferometer operation unless the mirror should move out of a beam path. Any vibration perpendicular to the plane of the plate 10 is largely prevented from introducing any relative displacement of the mirror plate 20 and the plate 10 because of the presence and location of the cylindrical pivot and distancing means 24. If such displacement does occur it is largely self-compensating since it affects the mirror in substantially equal but optically opposite manner on both sides of the pivot. Only bending vibration of the plate 20 over the pivot could produce misalignment but this can be eliminated simply by making the mirror plate 20 sufficiently rigid. In short, the present interferometer is modulated only by a tilt about the pivot and is, therefore, little affected by linear, as opposed to torsional, vibration.

The interferometer is also relatively immune to temperature changes because expansion or contraction of any of the elements tends only to produce self-compensating rather than significant differential displacements through thermal expansion or differential stress relief of adjustments.

Generally speaking, and with reference to the basic unit shown in FIG. 1, a light source 28 preferably including means 26 for essentially collimating the incident beam of radiation, will be placed at L and a suitable detecting device 29 will be placed at K. As will now be evident, the radiation source 28 can also be placed at R and the detector 29 at J. Since the optics of the device is symmetrical to a median plane, the sources and detectors can also to interchanged within the above configurations. The interference pattern can be conveniently observed, detected, or recorded at 29, as indicated by way of example with a detector cell 27.

It should be kept in mind that, wherever herein used, the term "light" is not restricted to radiation in the visible portion of the electromagnetic spectrum but may include infrared and ultraviolet energy. Wherever an auxiliary or measuring source is used, its wavelength will be so chosen that it is of optimal usefulness in the application at hand.

In an instrument according to FIG. 1, in successful operation, the plate 10 is a glass block 1" by 1" by 4", the mirror plate 20 measures 1¾" by 1", and the rod 24 has a diameter of ¼" and is 1" long; needless to say, the above 1" dimensions of the three elements run in the same direction.

It will be understood that either element can be fixed, or both floating, and that the pivot can be provided in various ways other than the rod herein shown, such as by a knife edge fastened to one element and resting on the other, or by sufficiently exact hinge means near the edges of the two elements such as plate 10 and mirror 20.

It will also be understood that the tilting movement between the two elements does not have to go through the zero retardation position where the surfaces are parallel, but can swing through an angle wholly at one side of that zero position. The use to which the present interferometer is put, with its prevailing conditions, is determining in this respect. The pivot axis is not necessarily parallel to the optically effective surfaces, but the radiant energy should impinge nearly perpendicular to a plane through the pivot line.

The impinging radiation is preferably collimated, but ray vergence can be selected in any way consistent with well known interferometric practice.

The material of the plate and mirror elements is selected in consideration of specific requirements. For example, if preservation of adjustment is of prime importance, glass or other relatively hard and brittle material is used since alignment is dependent solely on the dimensions and configuration of the components. If immunity to breakage is of prime importance, relatively shock resistant materials such as plastics and metal are used; such instruments will be more subject to misalignment than those made solely of glass, because of possible flow deformation of plastics.

Various practical applications which are materially improved or made possible by the above described rugged interferometer unit or constructions derived therefrom, will now be described with reference to FIGS. 4 to 6.

Multiple synchronous interferometers are inherently provided by the above described basic construction, as follows.

It will be evident to those familiar with this art that while one source at L of FIG. 1 is being detected at K a second source at J can be detected at R and that the two systems will operate without effect on each other. Thus there are inherently provided two synchronized interferometers with independent although completely coincident optical interference paths.

It will further be noted that optical path separation can also be achieved by placing two paths side by side spaced along the pivot axis, as distinct from the above coincident paths. Any number of independent paths, limited only by the length of the device along the pivot axis, can thus be stacked up along the pivot and all will operate synchronously. This is useful, for example, when simultaneous interferograms from a number of different sources are desired. FIG. 1a illustrates this embodiment.

*Standard interferometry.*—The instrument according to the invention is suitable for use in any of the standard interferometer applications. For use as a measurement device its light source will be selected to provide monochromatic light, the wavelength of which can serve as the base unit of measurement.

For example, for use as an angular measurement device, the mirror plate 20 is placed on a reference surface 31 as shown in FIG. 4, an extension arm 32 is attached to the plate 10 and a micrometer movement indicated at 33 is attached to the end of the arm. Working the micrometer movement will then vary the angle between the plate and the mirror. Such an arrangement can be used as a highly sensitive surface gauge and can measure heights referred to a central reference flat, by counting the number of monochromatic fringes traversed.

For use as a level, the mirror plate 20 is replaced by the free surface of a liquid for example mercury, a surface to be leveled is fastened parallel to the plate 10, and the interferometer is operated to make 10 parallel to the liquid surface and hence horizontal.

For use as a thickness measuring gauge, a unit according, or analogous to, that described with reference to FIG. 1 is supplemented with appropriate components, as illustrated in FIG. 5. In that figure, numerals 10 20, and 24 denote the plate, mirror plate, and pivot components similarly identified in FIG. 1. S is a light source, $f$ is a film of thickness $t$ to be measured, in an appropriate holder 35, and 36 is a detector. Suitable driving apparatus is indicated at T, comprising for example a drive coil 37 and a core 38 connected to the mirrow 20 and working against an adjustable spring 39. In this embodiment, the pivot lines are located between mirror 20 and rod 24 which can be fastened to plate 10.

Light from the source S is reflected from the plate 10 and directed as nearly as possible perpendicular towards film sample $f$. Since the index of refraction of $f$ will in general differ from that of the medium, usually air, one portion of the light will be reflected from the near surface and another portion from the far surface of $f$. Significant portions of the incident light will be reflected from both surfaces and returned toward the plate 10, whence it proceeds as explained above with reference to FIG. 1. If mirror 20 is tilted at a constant angular rate, the relative phase of the radiation arriving at 36 via the two paths D and H will vary at a constant rate alternately canceling and reinforcing. This causes an A.C. variation of the energy received by the detector 36 which can be recorded as an interferogram and is analogous to interferometric fringes.

As with other more conventional interferometers, the interference pattern using a broad band of wavelengths has a burst of A.C. located at the center of the pattern near zero retardation. The interferogram therefore exhibits a definite peak of A.C. modulation near its center.

Using a broad band source, as the tilt angle increases the A.C. components in the interferogram diminish until they are lost in detector noise. However, when 20 has tilted through an angle such that the difference in relative optical length (i.e. retardation) between paths D and H is equal to and opposite in sign from the difference in optical path length caused by the film sample of thickness $t$, an interferometric signal similar to that obtained at zero retardation will result. This critical path length difference is $x=2nt$ where $x$ is the retardation, $n$ the film index of refraction, and $t$ its thickness. The factor 2 accounts for the double trip through the film.

If, then, 20 is tilted at a constant angular rate through the zero retardation position where 10 is parallel to 20, until the angle is passed at which the $x=2nt$ interferometric signal emerges, and the interval between the two interferometric peaks is measured electronically, an effective measure of $t$, the thickness of the film, will be obtained.

Read out circuitry for the direct measurement of the interval between the two interferometric peaks is available, but not part of the present invention. Such circuitry will receive its input signal from detector 36 and will preferably include the drive coil 37 constituting an actuating transducer which, when a driving voltage of appropriate frequency is applied thereto, causes 20 to scan in the required manner. The spring device indicated at 39 provides an adjustable restoring force for the component 20. It will be evident that either 10 or 20 can be vibrated.

It will be understood by those skilled in this art that the arrangement of FIG. 5 of film $f$ and source S, is by way of example only. Any arrangement will be satisfactory that effects a relative retardation of the wave energy in paths D and H, respectively. Thus, the beams incident on $f$ and reflected therefrom could coincide, or the source S could be behind the film $f$, as indicated in dot and dash lines.

A thickness gauge of the above described construction incorporates all advantages of the interferometer unit according to the invention and in addition it provides for its peculiar purpose a very fast response suitable for monitoring fast-moving processes.

Interference spectroscopy.—The interferometer according to the invention is also highly useful in a great variety of spectroscopic applications and for such uses possesses the distinct advantages of interferometers in general, such as large throughput (the product of aperture area and solid angle of acceptance, in steradian-cm.$^2$) and small size, in addition to its own particular advantages such as simplicity, low cost, ease of alignment, stability, and vibration resistance. As well known, prism or grating spectrometers as well as interferometric spectrometers are widely in use. The former have the major disadvantage of large size for a given throughput. The later are all delicate of adjustment, and this is especially true of Michelson-type interferometers where a mirror vibrates to vary the retardation of one of the beams as a function of time. Such devices can be made quite small and have a throughput several orders of magnitude greater than that of prism or grating spectrometers, but they are difficult to align and usually require more than three high precision components. In a third type known as "mock interferometer," Ronchi gratings replace the entrance and exit slits of a conventional dispersion spectrometer and are synchronously rotated to change the effective grid spacing as a function of time; the resulting interferogram can be decoded to identify the spectral components of the energy source. This spectrometric technique is described in copending application Serial No. 147,319, filed October 24, 1961, by Lawrence N. Mertz and the present invention, now Patent No. 3,246,557 of April 19, 1966; its throughput is as high as that of the Michelson interferometer, it is easier to adjust and has better vibration resistance, but is in these respects surpassed by interference spectrometers which incorporate the present invention. Such an instrument will now be described.

With reference to FIG. 1, if radiation from a source at L is to be analyzed, the mirror 20 is rotated about the pivot 22 in such a manner that retardation is a linear function of time so that each wavelength of the incident energy will be modulated at a single identifying frequency. Thus the spectrum of radiant energy can so to speak be scaled down to an audio frequency spectrum at the detector, suitable for processing by standard electronic equipment to produce an interferogram and, upon further analysis, a spectrogram. The further analysis can be advantageously performed in the manner set forth in copending aplication Serial No. 120,600, filed June 29, 1961, by Lawrence Mertz, now Patent No. 3,286,582 of November 22, 1966.

Instead, push-pull detectors can be placed at J and K, since both beams are accessible. The two beams are then modulated in antiphase.

Phase lock drive systems are another application of the principle of the interferometer according to the present invention.

Since, as pointed out above, the invention makes available a plurality of synchronized and yet independent interference systems, interferometers constructed in this way lend themselves particularly well to an optical-electrical phase-lock drive system for providing the non-uniform rotation motion necessary to yield linear retardation with time. Assuming a monochromatic light source, such a system can produce linear retardation with time in interferometers according to FIG. 1 in the following manner.

The monochromatic source, such as a neon or argon bulb, is placed at K. The monochromatic energy is split at E into two beams E–D–C–B–A and E–H–G–F–A which will be recombined at A where they interfere. If a suitable detector is placed at L, the mirror drive can easily be monitored and controlled. So long as the optical retardation is a linear function of time, the detector will see the monochromatic source as a single, unique audiofrequency. Referring also to FIG. 6, this system will now be described more in detail.

The mirror 20 is assumed to be driven by the amplifier 41 through an appropriate transducer system forming no part of the present invention. A mirror scan oscillator 42 provides a periodic signal voltage which represents, to as near an approximation as possible, the desired motion of the mirror 20. As the interferometer is scanned the interference pattern produced by the monochromatic light is received at a detector 43. So long as the interferometer is being scanned properly, that is in such a way that retardation is a linear function of time, the signal from the detector 43 will contain but the above referred to single frequency which is representative of the wavelength of the monochromatic light. A stable reference oscillator 44 provides a reference signal at this frequency. This frequency is of course high as compared with the periodicity of the signal provided by the scanning oscillator 42. The signal from the detector 43 is amplified as at 45 and is compared with the signal from the reference oscillator 44 in a phase detector 46. So long as the interferometer is being scanned properly the phase detector will provide no signal but any deviation from linear retardation will cause a corresponding shift in phase and frequency of the detector signal and the phase detector 46 will provide an error signal. The error signal and the main scanning signal are summed in a mixer 47 in such a manner as to reduce the error according to conventional negative feedback or servo loop techniques.

Alternative interferometer constructions incorporating the principles explained above will now be described with reference to FIGS. 7 and 8. These and analogous alternate constructions share the advantages such as simplicity, ease of alignment, temperature stability and inherent vibration resistance, of the interferometer according to FIG. 1 and can be used in the same applications.

Figure 7:
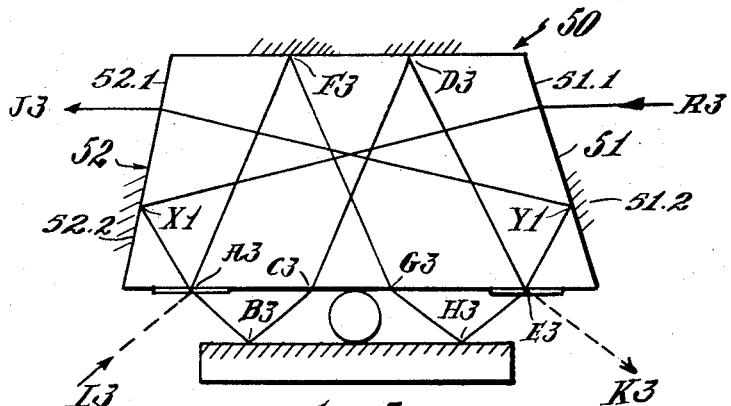
FIGS. 7 and 8 are schematic views, similar to FIG. 1, of three modifications of the unit according to FIG. 1.
Figure 8:
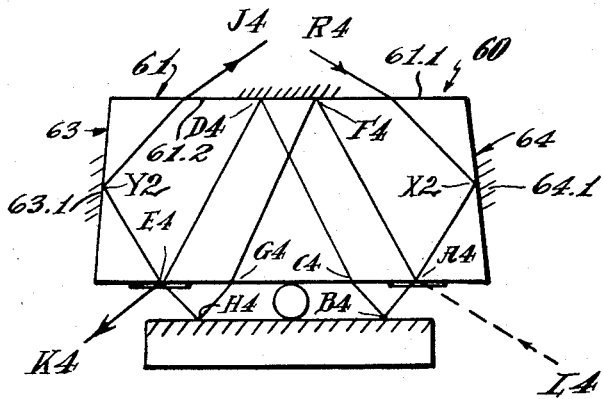

In the alternatives shown in FIGS. 7 and 8 the two interfering paths are essentially identical with those in the device of FIG. 1, the differences lying mainly in the way in which the entrance and exit beams are brought to and from the beam-splitting surfaces. Similar letter designations with qualifying numerals are used for corresponding interface areas.

In FIG. 7 the incident beam from R3 enters the transparent plate 50 through a transparent region 51.1 of an inclined side surface 51 and is then deflected at X1 on an opposing reflective region 52.2 of the similarly inclined side surface 52 by total internal reflection to the beam splitter portion A3. At A3 the incident energy is divided between the two interfering beam paths A3–F3–G3–H3–E3 and A3–B3–C3–D3–E3 into interfering relation at the beam splitter portion E3. The interference pattern can be observed at J3 through the transparent region 52.1 by way of total internal reflection of the exit beam at Y1 of reflective region 51.2, along a path complementary to that taken by the entrance beam. An advantage of the construction shown in FIG. 7 is that if the index of refraction $n$ of the plate 50 is greater than 1.74, the entrance and exit beams can be made parallel if the inclination of the side faces 51 and 52 is appropriately chosen. This arrangement also allows the transparent plate 50 to be substantially shorter.

In the arrangement shown in FIG. 8 the entrance and exit beams pass the plate 60 through the transparent region 61.1, 61.2 of its top surface 61 and are directed to their respective beam splitting portions A4 and E4 by fully reflective regions 63.1 and 64.1 with portions X2 and Y2 on the inclined side walls 63 and 64 of the plate 60. The arrangement of FIG. 8 allows much greater freedom than that of FIG. 7 in choosing both the index of refraction and the inclination of the side faces, while still keeping the transparent plate relatively short.

While particular embodiments have been disclosed by way of illustration, it should be understood that the invention includes all modifications and equivalents falling within the scope of the appended claims.

I claim:
1. Interference apparatus comprising:
a first surface having two reflective regions;

a second surface parallelly fixed to the first surface and having two separate transmissive-reflective regions and two separate transmissive regions therebetween;

a third surface adjacent the second surface having two separate regions being predominantly reflective toward the second surface;

the said regions being arranged for dividing radiation incident on one of the transmissive-reflective regions into two components directed towards adjacent reflective regions, on each of the first and third surfaces respectively, for reflection thereon of the components towards the other reflective regions of the third and first surfaces, respectively, through transmissive regions on said second surface, for further reflection thereon of the components towards the other transmissive-reflective region for recombination thereon;

elongate tilting means extending between the separate transmissive regions of the second surface and the separate reflective regions of the third surface, for forming a gap of variable angle between the second and third surfaces;

whereby variation of the gap angle causes the lengths of the two components to vary relatively to each other causing them to interfere with essentially parallel wave fronts at the recombining transmissive-reflective region.

2. Apparatus according to claim 1, wherein said first and second surfaces are formed on opposite faces of a first transparent plate, and the third surface is formed on a second plate facing the second surface of the first plate, the tilting means extending between the second and third surfaces.

3. Apparatus according to claim 2 further comprising: means for holding one of said two plates, and means for adjusting the angle of tilting between said two plates, whereby the inclination of said plates is indicated by the interference fringe pattern at said recombining transmissive-reflective region.

4. Appartaus according to claim 3, wherein said reflective regions of said third surface is defined by a reflecting liquid level, whereby the first plate can be adjusted into horizontal position.

5. Apparatus according to claim 2, further comprising: means for holding one of said two plates;
a source of radiation,
means for holding a transparent film in the path of said radiation directed towards one of said transmissive-reflective regions;
means for cyclically repeating said tilting, and
means for detecting the thickness of said film by the effect of the retardation due to said film as apparent at the other, recombining, transmissive-reflective region.

6. Apparatus according to claim 2, wherein said first plate has on its first surface an interiorly reflecting region between two transmissive regions, and on its second surface two transmissive regions between two transmissive-reflective regions.

7. Apparatus according to claim 2, wherein said second plate includes a mirror having an outer externally reflective surface adjacent to and reflecting towards said second surface of the first plate.

8. Apparatus according to claim 1, further comprising:
means for directing monochromatic radiation towards a first transmissive-reflective region for recombination at the other transmissive-reflective region; and
means for heterodyning an interference signal derived at the first transmissive-reflective region from radiation to be examined, with an interference signal derived at said other transmissive-reflective region from said monochromatic radiation;
whereby a spectrogram of said radiation to be examined can be obtained.

9. Apparatus according to claim 1, wherein said tilting means includes an essentially cylindrical rod inserted between and contacting the second surface between its transmissive regions, and the third surface between its reflective regions.

10. Apparatus according to claim 1, having
two additional surfaces intersecting said first and second surfaces outside said reflective regions of the first surface and outside said transmissive-reflective regions of the second surface, respectively, one of said additional surfaces having a transmissive region and the other additional surface having an internally reflective region,
whereby radiation directed towards the transmissive region of one additional surface is by the internally reflective region of the other additional surface reflected toward the adjacent transmissive-reflective region of the second surface for division thereon, and is from there reflected and transmitted to the other transmissive-reflective region of the second surface for recombination.

11. Apparatus according to claim 1, having
on said first surface at least one transmissive region outside of a reflective region; and having
at least one additional surface intersecting said first and second surfaces outside a reflective region of the first surface and outside a transmissive-reflective region of the second surface thereof, said additional surface having an internally reflective region,
whereby radiation directed towards said transmissive region of the first surface is by the internally reflective region of the adjacent additional surface directed toward the adjacent transmissive-reflective region of the second surface for division thereon and is from there reflected and transmitted to the other transmissive-reflective region of the second surface for recombination.

12. Interferometric apparatus comprising:
a first, transparent plate with a first surface having predominantly internally reflective regions, and with a second surface parallel to said first surface and having two transmissive-reflective regions and therebetween transmissive regions;
a second plate having predominantly reflective surface regions;
means for cyclically tilting said plates relatively to each other such as to form therebetween a gap of variable angle;
means for holding a film;
a source of radiation;
means for directing radiation from said source towards said film and from the film towards one of said transmissive-reflective regions, to divide the radiation into two separate components of similar geometry, said components being deviated at said reflective regions and transmitted by said transmissive regions, and said components being recombined at the other transmissive-reflective region; and
means directed towards said recombining region for detecting the cyclically varying interference fringe pattern appearing at said recombining region;
whereby deflection of the radiation of the two film surfaces and variation of said gap angle causes the lengths of the two components to vary relatively to each other causing them to interfere with essentially parallel wave fronts at the said other transmissive-reflective region, and the cyclic interference fringe variation furnishes a signal indicating the thickness of the film.

13. An interferometer comprising:
a plane mirror;
a transparent plate having a pair of parallel, optically flat faces with semi-reflective regions spaced by transmissive regions on the face next to the mirror and totally reflective regions on the other face; and pivot means inserted between said plate and said mirror and having linearly extending bearing means for inclining and maintaining said plate and said mirror in spaced pivotal relation;

said regions being arranged in a pattern defining two optical beam path components between a first semi-reflective region for dividing the beam and a second semi-reflective region for recombining the components, by way of reflection and transmission of each component, between the two semi-reflective regions, one of said beam path components being reflected first from said mirror and secondly from one of the totally reflective regions of said plate, the second of said beam path components being reflected first from another of said totally reflective regions of said plate and secondly from said mirror, the path components interfering at the second semi-reflective region with a retardation dependent upon the relative inclination between said plate and said mirror.

14. Interferometer according to claim 13, wherein said pivot means is an elongate tilting means extending between said mirror and said transmissive regions of said plate, for forming a gap between mirror and plate, and for varying the angle of said gap.

References Cited

UNITED STATES PATENTS 2,518,647  8/1950  Teeple et al. _____ 88—14
2,612,074  9/1952  Mirau _____ 88—14

OTHER REFERENCES

Donath et al., Radial Shearing Interferometer, Journal of Optical Society of America, vol. 53, January–June 1963, p. 395.

JEWELL H. PEDERSEN, *Primary Examiner.*

B. J. LACOMIS, *Assistant Examiner.*